United States Patent
Mahkonen et al.

(10) Patent No.: US 7,174,184 B2
(45) Date of Patent: Feb. 6, 2007

(54) METHOD AND APPARATUS FOR CONTROLLING COMMUNICATION BETWEEN USER EQUIPMENT AND A BASE STATION IN A RADIO ACCESS NETWORK

(75) Inventors: Marko K. Mahkonen, Kirkkonummi (FI); Otto-Aleksanteri Lehtinen, Raisio (FI); Jose Leira Paz, Tampere (FI)

(73) Assignee: Nokia Corporation, Espoo (FI)

( * ) Notice: Subject to any disclaimer, the term of this patent is extended or adjusted under 35 U.S.C. 154(b) by 540 days.

(21) Appl. No.: 10/737,190

(22) Filed: Dec. 15, 2003

(65) Prior Publication Data

US 2004/0166891 A1 Aug. 26, 2004

Related U.S. Application Data

(60) Provisional application No. 60/435,169, filed on Dec. 20, 2002.

(51) Int. Cl.
*H04B 7/00* (2006.01)
*H04Q 7/20* (2006.01)

(52) U.S. Cl. .............. 455/522; 455/450; 455/101; 455/434; 455/458; 455/436; 455/69; 455/435.2; 370/349; 370/331; 714/780; 714/749

(58) Field of Classification Search .............. 455/69, 455/522, 101, 525, 434, 435.2, 435.3, 437, 455/458, 436, 422.1; 370/349, 331
See application file for complete search history.

(56) References Cited

U.S. PATENT DOCUMENTS

| | | | | |
|---|---|---|---|---|
| 5,943,610 A | * | 8/1999 | Endo ............................ | 455/69 |
| 6,075,974 A | * | 6/2000 | Saints et al. .................. | 455/69 |
| 6,208,873 B1 | * | 3/2001 | Black et al. ................. | 455/522 |
| 6,212,399 B1 | * | 4/2001 | Kumar et al. ............... | 455/522 |
| 6,275,487 B1 | * | 8/2001 | Szalajski et al. ............ | 370/647 |
| 6,311,070 B1 | * | 10/2001 | Tong et al. .................. | 455/522 |
| 6,334,047 B1 | * | 12/2001 | Andersson et al. .......... | 455/69 |
| 6,374,112 B1 | * | 4/2002 | Widegren et al. ........ | 455/452.2 |

(Continued)

OTHER PUBLICATIONS

U.S. Appl. No. 10/435,531, filed May 9, 2003, Otto-Aleksanteri Lehtinen et al.

(Continued)

*Primary Examiner*—Marceau Milord
(74) *Attorney, Agent, or Firm*—Ware, Fressola, Van Der Sluys & Adolphson LLP (57) ABSTRACT

A method (30) (and equipment adapted to operate according to the method) for enabling or disabling (i.e. triggering) an attribute of communication between a UE device and a NodeB under the control of a RNC using System Information Blocks (SIBs) as a way of configuring communication channels provided by the RNC, the method including: a step (35) in which the NodeB configures itself for communication with the UE device according to a trigger field (40) consisting of typically several bits corresponding to one or more attributes and included in one or more SIBs; and a step (35) in which the NodeB transmits to the UE device the SIB(s) including the trigger field. A multi-bit trigger field can be used to simultaneously control either a number of attributes, or can be interpreted as indicating a value of a single, multi-level attribute (or can be used both ways at the same time).

23 Claims, 3 Drawing Sheets

U.S. PATENT DOCUMENTS

| | | |
|---|---|---|
| 6,628,946 B1 | 9/2003 | Wiberg et al. |
| 6,760,598 B1 * | 7/2004 | Kurjenniemi ............... 455/522 |
| 6,862,450 B2 * | 3/2005 | Mikola et al. .............. 455/438 |
| 7,010,317 B2 * | 3/2006 | Hwang et al. .............. 455/522 |
| 7,027,828 B2 * | 4/2006 | Kim et al. .................. 455/522 |
| 7,031,254 B2 * | 4/2006 | Abraham et al. ........... 370/229 |
| 7,043,242 B2 * | 5/2006 | Kuiri et al. ................. 455/436 |
| 2002/0044552 A1 | 4/2002 | Vialen et al. |
| 2002/0141331 A1 | 10/2002 | Mate et al. |
| 2003/0219010 A1 | 11/2003 | Peng |

OTHER PUBLICATIONS

U.S. Appl. No. 10/138,025, filed May 1, 2002, Janne Kurjenniemi.

* cited by examiner

METHOD AND APPARATUS FOR CONTROLLING COMMUNICATION BETWEEN USER EQUIPMENT AND A BASE STATION IN A RADIO ACCESS NETWORK

CROSS REFERENCE TO RELATED APPLICATION

Reference is made to and priority claimed from U.S. provisional application Ser. No. 60/435,169, filed Dec. 20, 2002, entitled METHOD AND APPARATUS FOR CONTROLLING COMMUNICATION BETWEEN USER EQUIPMENT AND A BASE STATION IN A RADIO ACCESS NETWORK.

FIELD OF THE INVENTION

The invention pertains to communication between user equipment accessing a radio access network of a cellular communications network and elements of the radio access network, and more particularly to triggering communication states so as to control attributes of the communication between the user equipment and the radio access network.

BACKGROUND OF THE INVENTION

In 3GPP (3rd Generation Partnership Program) WCDMA (wideband code division multiple access) technology used for communication between a 3G RAN (radio access network) on the one hand, i.e. a so-called UTRAN (Universal Mobile Telecommunications System or UMTS Terrestrial Radio Access Network) including a NodeB and a (controlling) RNC (radio network controller), and a UE (user equipment) device (such as a mobile phone but also other kinds of devices equipped for cellular communication) on the other hand, it is advantageous to have different ways of specifying an attribute of the communication between the NodeB and the UE device.

A relatively complex example of triggering an attribute of the communication between a NodeB and a UE device is triggering (setting) a power level to be used by the UE in the UE to NodeB transmissions. In other words, what is triggered is one or another level of power control. Another, simpler example is triggering redundancy in data being exchanged between a NodeB and a UE. The prior art provides mechanisms for controlling power level and transmitter antenna diversity, but it is advantageous to have other, new ways to do so.

For some attributes, the triggering (enabling or disabling) should be controlled by the RNC, not the NodeB. In other cases, it is advantageous to have the NodeB control the triggering, perhaps using information received by UE devices, and also perhaps controlling an attribute according to guidelines or limits imposed by the controlling RNC.

Thus, it would be advantageous to have a new way (mechanism) by which to trigger (enable or disable) attributes used in (or governing) communication between a RAN and a UE device, and in particular, a way that would allow control or guidance by an RNC as well as local control by a NodeB.

SUMMARY OF THE INVENTION

Accordingly, in a first aspect of the invention a method is provided for enabling or disabling an attribute used in respect to communication between a NodeB and a user equipment (UE) device, the NodeB operative according to control by a radio network controller (RNC) of a radio access network (RAN) using System Information Blocks (SIBs) communicated between elements of the RAN and communicated to the UE device in radio contact with the RAN as a way of configuring communication channels provided by the RAN, the method including: a step in which the NodeB configures itself for communication with the UE device according to a trigger field consisting of at least one bit included in at least one of the SIBs, wherein the at least one bit corresponds to the attribute; and a step in which the NodeB transmits to the UE device the SIB including the trigger field. (For some trigger fields, the NodeB may not have to adjust any attributes to configure itself according to the trigger fields. Also, the NodeB may in some cases not configure itself according to a trigger field until after transmitting the trigger field to the UE device.)

In accord with the first aspect of the invention, method may also include a step in which the RNC communicates to the NodeB information sufficient to indicate the trigger field.

Also in accord with the first aspect of the invention, the method may also include a step in which the UE device configures itself for communication with the NodeB according to the trigger field and transmits to the NodeB a confirmation or other response to receipt of the SIB including the trigger field. Further, the trigger field may be used to prompt a response from the UE device, and the method may also include a step in which the NodeB completes a procedure upon receipt of the response from the UE device. Also further, the method may also include a step in which, upon receipt of the response from the UE, the NodeB communicates the response to the RNC.

Also in accord with the first aspect of the invention, the trigger field may consist of a plurality of bits each of which corresponds to a predetermined attribute governing communication between the UE device and the NodeB, and one of each of the two possible bit values of the respective bits is predetermined to indicate enabling the corresponding attribute.

Still also in accord with the first aspect of the invention, a plurality of SIBs may each be used to convey a respective trigger field and each such trigger field consists of at least one bit predetermined to correspond to a respective attribute governing communication between the UE device and the NodeB.

Even still also in accord with the first aspect of the invention, the trigger field communicated to the NodeB by the RNC may be a limit trigger field consisting of a plurality of bits and understood by the NodeB to indicate not a particular set of attributes but instead a limit on a multi-valued attribute, and the method may also include steps, performed after the RNC communicates to the NodeB the limit trigger field, in which the NodeB repetitively communicates a value-setting trigger field indicating a value within the limit set by the limit trigger field. Further, the UE device may respond to receipt of each of the value-setting trigger fields, and the communicating of the value-setting trigger fields and corresponding responses may form a closed loop message sequence involving the NodeB and the UE device but not involving the RNC.

In a second aspect of the invention, a NodeB is provided, comprising means so as to be operative according to respective steps of the method provided in the first aspect of the invention.

In a third aspect of the invention, an RNC is provided, comprising means so as to be operative according to respective steps of the method provided in the first aspect of the invention.

In a fourth aspect of the invention, a UE device is provided, comprising means so as to be operative according to respective steps of the method provided in the first aspect of the invention.

In a fifth aspect of the invention, a RAN is provided, comprising an RNC and a plurality of NodeBs, the RNC and at least one NodeB each comprising means so as to be operative according to respective steps of the method provided in the first aspect of the invention.

The invention requires only small changes to any RAN system design already providing SIBs (and UTRAN is one such RAN) since the invention requires only adding one or more bits to one or more SIBs (including possibly adding several bits to each of several different SIBs).

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention adds a new field to what is known as an SIB (system information block) used by a radio access network (RAN) of a telecommunications system in governing communication with UE devices connected to the RAN, i.e. in governing communications across the Uu (air) interface. As is known, in a telecommunications network according to 3GPP (Third Generation Partnership Program) and so including a RAN designated as UTRAN (Universal Mobile Telecommunications System Terrestrial Radio Access Network) and including a plurality of Radio Network Controllers (RNCs) each of which controls a plurality of so-called NodeBs (akin to base transceiver stations of earlier telecommunication systems in that the NodeBs communicate directly with UE devices over the air interface, called the Uu interface), system information is provided by SIBs, which are broadcast by the RAN to (all) UE devices connected to RAN. There are eighteen SIBs, each conveying different system information, and also a master information block (MIB) and two scheduling blocks (SBs). SIBs are sent according to a schedule indicated by the SBs, with the more important SIBs sent more often than the less important SIBs. Not all SIBs affect all UE devices connected to the RAN, and a UE device need only read SIBs that affect how it communicates with the RAN.

According to the invention, to trigger (enable or disable) one or more attributes of communication between a NodeB and a UE device, the controlling RNC Layer 3 includes a trigger field in an SIB to trigger one or more attributes of the UE/NodeB communication. The invention also provides for using a plurality of trigger fields each in a different SIB for controlling sets of attributes of the UE/NodeB communication. The invention encompasses protocols in which the controlling RNC provides trigger fields under the direction of the core network or other RAN controlling entity, as well as protocols in which the controlling RNC acts autonomously in providing trigger fields, and even protocols in which the NodeB acts autonomously in providing trigger fields to its UE devices, i.e. whether or not it has received a trigger field from its controlling RNC, or within guidelines or a limit set by the RNC, as described below.

Among embodiments in which the RNC sends to a NodeB a trigger field, the invention encompasses two main embodiments. In a first embodiment, shown in FIG. 1A and discussed in more detail below, the trigger field is sent from the RNC to a UE device via the NodeB to which the UE device is connected, without the NodeB itself reading the trigger field, but instead learning of the trigger field value from response by the UE to receiving the trigger field. In other words, in the first embodiment, the NodeB simply forwards the trigger field (in the SIB). In a second embodiment, shown in FIG. 1B and shown in more detail below, the trigger field is sent from the RNC to a UE device via the NodeB to which the UE device is connected, but when the trigger field arrives at the NodeB, instead of simply forwarding it to the UE device, the NodeB reads the trigger field and also forwards it to the UE device.

Figures 1A, 3:
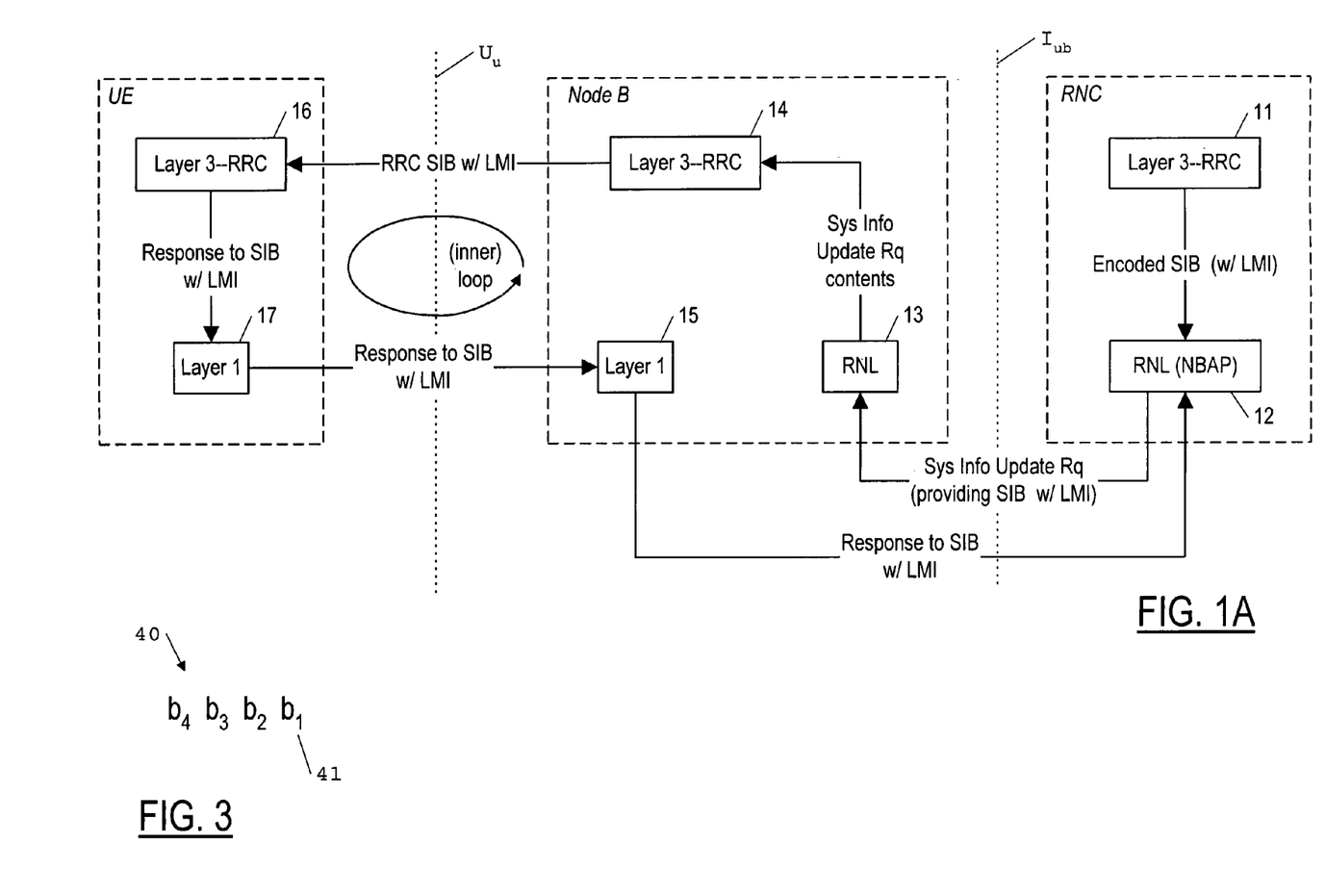
FIG. 1A is a block diagram showing elements of a radio access network (RAN), including a NodeB and a radio network controller (RNC), and also showing a user equipment (UE) device, all operative according to a first embodiment of the invention.
FIG. 3 is a schematic of a trigger field provided by the invention.
Figure 1B:
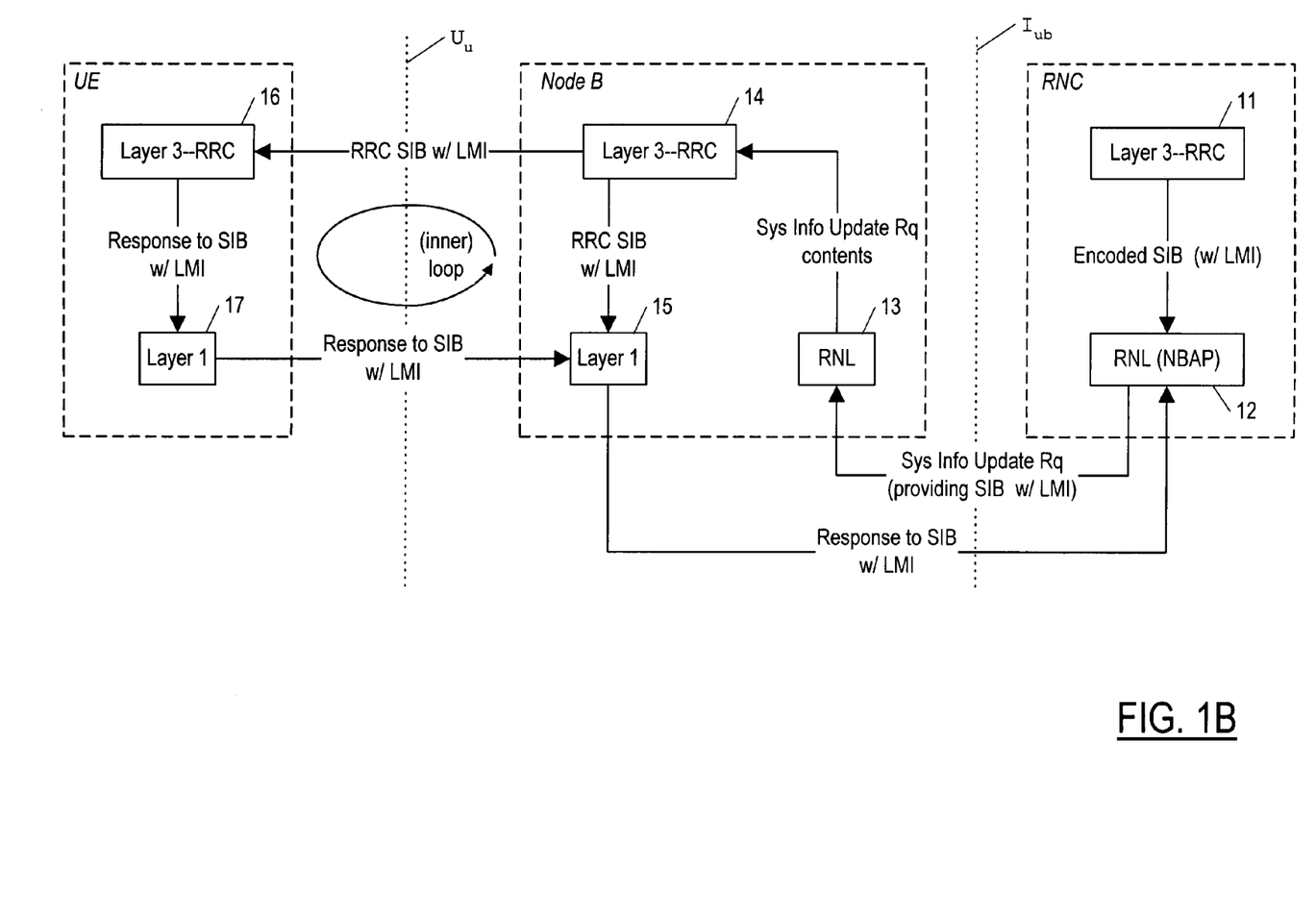
FIG. 1B is a block diagram showing the same entities as in FIG. 1A, but operative according to a second embodiment of the invention.

In the embodiments shown in FIGS. 1A and 1B, the trigger field sent by the RNC can be sent to a single NodeB, or it can be sent to two or more NodeBs under the control of the RNC. Each NodeB receiving the trigger field then broadcasts it so that all UEs in contact with the NodeB receive it so that, typically, it is intended to control an attribute of the communication between the NodeB and all UEs in contact with the NodeB. However, in general, the trigger field might be used to control the attributes of communication between a NodeB and only one or some of the UEs in contact with the NodeB, since it is possible that only some of the UEs might be equipped to respond to a trigger field according to the invention, and it is also possible that the NodeB-UE protocol might be extended to allow the trigger field in an SIB, even though broadcast to all UEs, to apply to only some of the UEs.

Preferably, the trigger field is a multi-bit field, such as a four-bit field, and so allows indicating a number of communication states in which the NodeB/UE device communication can occur. In case of a four-bit trigger field, sixteen communication states can be indicated, each state being defined by which attributes out of up to four attributes are enabled, i.e. each state corresponds to a particular combination of the four attributes being enabled, states such as for example the sixteen communication states indicated in the table below, providing all possible enabled and disabled states of four attributes, the right-most bit affecting a 1st attribute, the next bit affecting a 2nd attribute, and so on. Alternatively, each state may correspond to whether or not a level of a multi-level attribute is enabled, or as another alternative, a combination of the above, i.e. some states may correspond to a particular combination of some number of attributes being enabled and some other states may correspond to whether or not a level of a multi-level attribute is enabled.

| Information Element | Type | Comment |
| --- | --- | --- |
| Trigger Field | Bit String (4 bits) | 0000 - All attributes OFF (disabled) <br> 0001 - Only first attribute ON i.e. enabled <br> 0010 - Only $2^{nd}$ attribute ON <br> 0011 - $1^{st}$ and $2^{nd}$ attributes ON <br> . . . other combinations) <br> 1111 - All four attributes ON |

Referring now to FIG. 1A, the messaging according to the invention in the first embodiment for triggering one or more attributes is shown as including having the RNC-RRC 11 send the SIBs and frame scheduling in encoded form to the RNL (NBAP) 12. The RNC-RNL 12 builds a SYSTEM INFORMATION UPDATE REQUEST (a standardized message) including the SIBs and frame scheduling within the request and sends it over the Iub interface to the NodeB-RNL 13. The NodeB-RNL 13 receives the SYSTEM INFORMATION UPDATE REQUEST message and sends its contents to the NodeB-RRC 14. The NodeB-RRC 14 reads the trigger field and then builds an RRC SIB including in it the (one or more) SIB(s) bearing the trigger field(s), and the NodeB-RRC 14 then sends the RRC SIB to its peer in the UE device, i.e. the UE Layer three (UE-L3) 16, via the NodeB-L1 15 over the Uu (air) interface to the UE-L1 17. When the UE-L3 receives the SIB(s) bearing the trigger field(s), it triggers the attributes in the UE-L1 17 according to the trigger field(s) in the SIB(s). Finally, the UE-L1 17 closes the communication loop sending a response to the NodeB-L1 confirming the one or more communication states that have been triggered or otherwise responding to the trigger field. The confirmation can be express or it can be implied by the behavior of the UE device (i.e. implied by the UE device behaving as instructed, as indicated by a subsequent communication with the NodeB can be taken as confirmation). The attributes in the NodeB-L1 15 are triggered when the NodeB-L1 15 receives the confirming response from the UE-L1 17. (Since if the response is an implied confirmation the NodeB-L1 15 will not receive the trigger field with the response, the first embodiment requires that the confirming response be express and so include the trigger field, unless the NodeB can determine what the trigger field was from the behavior of the UE device.)

Referring now to FIG. 1B, the messaging according to the invention in the second embodiment is the same as in the first embodiment except in the following respects. First, the attributes are triggered in the NodeB not upon receiving a confirming response from the UE, but instead just before or after the NodeB-L1 15 communicates the trigger field(s) to the UE device. More specifically, when the NodeB-RRC 14 receives the System Information Update Request contents from the NodeB-RNL 13, reads the trigger field and builds an RRC SIB including in it the (one or more) SIB(s) bearing the trigger field(s), it then not only sends the RRC SIB(s) to its peer in the UE device, i.e. to the UE-L3 16 (via the NodeB-L1 15 over the Uu interface to the UE-L1 17), but the NodeB-RRC 14 also triggers the attributes in the NodeB-L1 15 according to the trigger field(s) in the SIB(s). Second, the confirmation from the UE device can be express or it can be implied by the behavior of the UE device (i.e. the UE device behaving as instructed, as indicated by a subsequent communication with the NodeB can be taken as confirmation).

As also shown in FIGS. 1A and 1B, the invention also encompasses having the NodeB, upon receipt of a response (confirmation or other response) from a UE device after the UE receives a trigger field, in some cases forward the response to the RNC, depending on the protocol that is used for communication. Thus, both an inner (fast) loop and an outer (slow) loop messaging mechanism (RNC to UE and back via NodeB) are encompassed.

Figure 2:
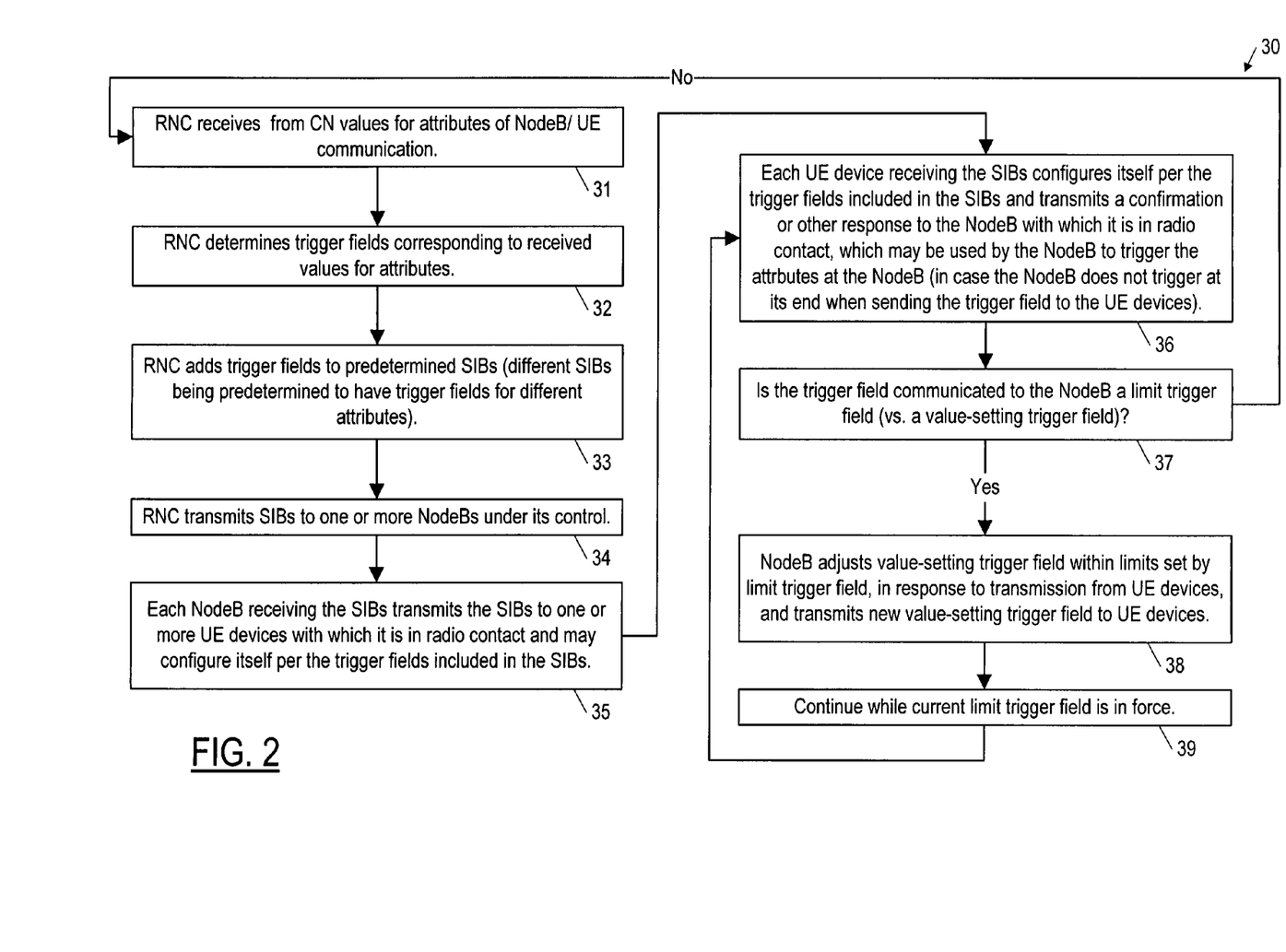
FIG. 2 is a flowchart of a method for using a trigger field to trigger attributes of communication between a NodeB and a UE, according to the invention.

Referring now to FIG. 2, the invention is shown as a method (30) for enabling or disabling an attribute used by a NodeB in communicating with a user equipment (UE) device. In a first step 31, the RNC receives from the CN values for one or more attributes governing NodeB/UE communication. In a next step 32, the RNC determines trigger fields corresponding to received values for the attributes. In a next step 33, the RNC adds one or more trigger fields to one or more predetermined respective SIBs (different SIBs having been predetermined to convey trigger fields for different attributes). In a next step 34, the RNC transmits the one or more SIBs to one or more NodeBs under its control (according to the schedule governing transmission of the different SIBs). In a next step 35, each NodeB receiving the one or more SIBs transmits the one or more SIBs to one or more UE devices with which it is in radio contact, and may also trigger the attributes at its end (as in the second embodiment, illustrated in FIG. 1B). In a next step 36, each UE device receiving the one or more SIBs configures itself per the trigger fields included in the SIBs and transmits a confirmation or other response to the NodeB with which it is in radio contact, a response which may be used by the NodeB to trigger the attributes at its end (as in the first embodiment, illustrated in FIG. 1A). It should be noted that in some applications a trigger field may require only that the UE configure itself or that only the NodeB configure itself; a trigger field does not always correspond to a change in configuration of both the NodeB and the UE devices in contact with it. For example, if a trigger field is used to toggle to a lower rate of reporting by a UE device information used by the controlling NodeB, the NodeB may not have to reconfigure itself at all as the trigger field value changes.

Also shown in FIG. 2 are steps 37–39 for embodiments in which in which in step 34 the RNC communicated to the NodeB what is here called a limit trigger field, for establishing a limit on a multi-level attribute (such as power), and the NodeB then has authority to control the level (value) of the multi-level attribute by issuing a succession of what are here called value-setting trigger fields (to distinguish from limit trigger fields) each commanding that the UE devices use a certain level (value) for the multi-level attribute, making certain that the value used does not exceed the limit set by the limit trigger field. Thus, in a next step 37, the NodeB determines whether the trigger field it has received from the RNC (as a result of step 34) is a limit trigger field (vs. a value-setting trigger field). If so, then in a next step 38, in response to confirming transmissions from the UE devices provided in step 36, the NodeB adjusts a value-setting trigger field within the limit set by the limit trigger field and transmits a new, different value-setting trigger field to the UE devices. (Using methods known in the art, some values for the multi-level attribute can be made to apply to only some UE devices in contact with a NodeB even though the value-setting trigger fields are broadcast to all UE devices in contact with the NodeB.) In a last step 39, the NodeB continues to control the multi-level attribute within the limit set by the limit trigger field as long as the current limit trigger field is in force, i.e. until the NodeB receives a new limit trigger field from the RNC.

As already mentioned, power (used by a UE in transmitting to a NodeB) can be viewed as a multi-level attribute, and can be controlled using the invention by regarding a multi-bit trigger field as having possible values corresponding to different power levels. Another example of a multi-level attribute that might be controlled using the invention is in connection with NodeB transmitter (TX) antenna diversity. The UTRA specifications divide the transmitter diversity modes into two categories: open-loop mode and closed-loop mode. In open-loop mode, the UE provides no feedback to the NodeB, and so in open-loop the UTRAN has to determine by itself appropriate parameters for TX antenna diversity. In closed-loop mode, the UE sends feedback information to the NodeB so that the NodeB can optimize transmissions from its diversity TX antennas. Open-loop mode is typically used for common channels since a NodeB cannot optimize its common channel transmissions according to measurements made by a particular UE. Closed-loop mode is used for dedicated physical channels, which have an uplink channel for feedback information. The invention can be used for either mode (i.e. to control NodeB TX antenna diversity with or without feedback from a UE), but considering here in particular the closed-loop mode, a UE controls the transmit diversity in a NodeB with which it is in contact by sending adjustment commands on an uplink channel. The UE uses the NodeB's common pilot channels to estimate the channels (corresponding to each antenna) separately. Based on the estimation made using the common pilot channels, the UE determines an adjustment to maximize the UE's received power, and sends it to the NodeB. The adjustments are made at a certain rate and with a certain precision. The invention can be used to have the NodeB prescribe to the UE either the rate at which the adjustments are sent or the precision with which the adjustment is given, using respective multi-bit trigger fields, each interpreted by the UE as corresponding to the two multi-level attributes: rate of adjusting and precision of adjustment. (Since the invention uses the SIB to communicate a trigger field, which is communicated only from the NodeB to the UEs in its cell, the invention would not be used to have a UE control the NodeB antenna diversity, but only, as indicated above, to have the NodeB control the rate of adjustment or its precision.) The NodeB can control the adjustment rate and precision either autonomously, or within limits set by the RNC and communicated to the NodeB as a limit trigger field, as described above, or the RNC can itself set the adjustment rate and precision using a value-setting trigger field it sends to the UE via the NodeB (which need not necessarily interpret the field itself). (Further, the RNC may in turn control the adjustment rate and precision based on commands or guidance it receives from the core network.)

The invention also comprehends having the NodeB use a trigger field to trigger (prompt) a signal (response) from a UE device with no change in the attributes of the NodeB-UE communication, and to use receipt of the triggered response to conclude a procedure being performed by the NodeB. For example, a NodeB may send such a trigger field to a UE device and then start a beam-forming procedure using (e.g. a VHF Omnidirectional Range (VOR) procedure) to determine the location of the UE device relative to the NodeB. The NodeB would then complete (terminate) the procedure upon receiving the response triggered by the trigger field (after scanning to determine the angle of arrival of the response from the UE device).

Another example of the use of the invention in controlling the attributes of communication between a UE device and a NodeB is in using a trigger field provided according to the invention (in an SIB) to toggle between two communication mechanisms, say mechanism A and mechanism B, each using the same bit format, but mechanism A having repetition coding, i.e. using some bits for redundancy so as to protect data (information) being conveyed, and mechanism B not having redundancy and so possibly able to convey more information per unit time.

With the invention, the RNC specifies an attribute of the UE/NodeB communication that is to be triggered, and therefore it is possible for the core network or RAN controlling device to actually decide on and specify to the RNC which attributes are to be triggered. Further, the invention provides for centralized triggering of attributes in that an RNC controls the attributes in all of the NodeBs it controls.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for controlling an attribute of a communication channel used in respect to communication between a NodeB and a user equipment device, the NodeB operative according to control by a radio network controller of a radio access network using system information blocks communicated between elements of the radio access network and communicated to the user equipment device in radio contact with the radio access network as a way of configuring the communication channel, the method comprising:

the NodeB configuring the communication channel for communication with the user equipment device according to a trigger field consisting of at least one bit included in at least one of the system information blocks, wherein the trigger field is predetermined to correspond to the attribute so as to either enable or disable the attribute or set a value or a limit for the attribute; and the NodeB transmitting to the user equipment device the system information block including the trigger field.

2. A method as in claim 1, further comprising the radio network controller communicating to the NodeB information sufficient to indicate the trigger field.

3. A method as in claim 1, further comprising the user equipment device configuring itself for communication with the NodeB according to the trigger field and transmitting to the NodeB a confirmation or other response to receipt of the system information block including the trigger field.

4. A method as in claim 3, wherein the trigger field is used to prompt a response from the user equipment device, and the method further comprises the NodeB completing a procedure upon receipt of the response from the user equipment device.

5. A method as in claim 3, further comprising, upon receipt of the response from the user equipment, the NodeB communicating the response to the radio network controller.

6. A method as in claim 1, wherein the trigger field consists of a plurality of bits each of which corresponds to a predetermined attribute governing communication between the user equipment device and the NodeB, and one of each of the two possible bit values of the respective bits is predetermined to indicate enabling the corresponding attribute.

7. A method as in claim 1, wherein a plurality of system information blocks are each used to convey a respective trigger field and each such trigger field consists of at least one bit predetermined to correspond to a respective attribute governing communication between the user equipment device and the NodeB.

8. A method as in claim 1, wherein the trigger field communicated to the NodeB by the radio network controller is a limit trigger field consisting of a plurality of bits and understood by the NodeB to indicate not a particular set of attributes but instead a limit on a multi-valued attribute, and the method further comprises, after the radio network controller communicates to the NodeB the limit trigger field the NodeB repetitively communicating a value-setting trigger field indicating a value within the limit set by the limit trigger field.

9. A method as in claim 8, wherein the user equipment device responds to receipt of each of the value-setting trigger fields, and further wherein the communicating of the value-setting trigger fields and corresponding responses form a closed loop message sequence involving the NodeB and the user equipment device but not involving the radio network controller.

10. A method as in claim 1, wherein the system information blocks are broadcast.

11. A method as in claim 1, wherein the system information blocks are one or more of eighteen different system information blocks that are broadcast.

12. A NodeB comprising:
means for configuring a communication channel for communication with a user equipment device according to a trigger field consisting of at least one bit included in a system information block, wherein the trigger field is predetermined to correspond to an attribute of the communication channel so as to either enable or disable the attribute or set a value or a limit for the attribute; and
means for transmitting to the user equipment device the system information block including the trigger field.

13. A system, comprising:
a user equipment device;
a radio access network including at least one radio network controller and at least one NodeB operating under the control of the radio network controller and coupled to the user equipment device via cellular communication signals;
wherein the NodeB is as in claim 12.

14. A radio network controller of a radio access network, comprising:
means for determining information sufficient to indicate a trigger field consisting of at least one bit included in a system information block, wherein the trigger field is predetermined to correspond to an attribute of a communication channel between a NodeB and a user equipment device so as to either enable or disable the attribute or set a value or a limit for the attribute; and
means for communicating the information to the NodeB for communication to the user equipment device.

15. A user equipment device, comprising:
means for receiving from a NodeB of a radio access network a trigger field consisting of at least one bit included in a system information block, wherein the trigger field is predetermined to correspond to an attribute of a communication channel used for communication between the NodeB and the user equipment device so as to either enable or disable the attribute or set a value or a limit for the attribute; and
means for configuring itself for communication with the NodeB according to the trigger field and for transmitting to the NodeB a confirmation or other response to receipt of the system information block including the trigger field.

16. A NodeB, comprising a protocol stack, in turn comprising:
a higher level protocol layer, for configuring a communication channel for communication with a user equipment device according to a trigger field consisting of at least one bit included in a system information block, wherein the trigger field is predetermined to correspond to an attribute of the communication channel so as to either enable or disable the attribute or set a value or a limit for the attribute; and
a lowest level protocol layer, for transmitting to the user equipment device the system information block including the trigger field.

17. A NodeB as in claim 16, wherein the system information blocks are broadcast.

18. A NodeB as in claim 16, wherein the system information blocks are one or more of eighteen different system information blocks that are broadcast.

19. A radio network controller of a radio access network, comprising a protocol stack, in turn comprising:
a higher level protocol layer, for determining information sufficient to indicate a trigger field consisting of at least one bit included in a system information block, wherein the trigger field is predetermined to correspond to an attribute of a communication channel between a NodeB and a user equipment device so as to either enable or disable the attribute or set a value or a limit for the attribute; and
a lowest level protocol layer, for communicating the information to the NodeB for communication to the user equipment device.

20. A user equipment device, comprising a protocol stack, in turn comprising:
a lowest level protocol layer, for receiving from a NodeB of a radio access network a trigger field consisting of at least one bit included in a system information block, wherein the trigger field is predetermined to correspond to an attribute of a communication channel used for communication between the NodeB and the user equipment device so as to either enable or disable the attribute or set a value or a limit for the attribute; and
a higher level protocol layer, for configuring itself for communication with the NodeB according to the trigger field and for transmitting to the NodeB a confirmation or other response to receipt of the system information block including the trigger field.

21. A user equipment device as in claim 20, wherein the system information blocks are broadcast.

22. A user equipment device as in claim 20, wherein the system information blocks are one or more of eighteen different system information blocks that are broadcast.

23. A system, comprising:
a user equipment device;
a radio access network including at least one radio network controller and at least one NodeB operating under the control of the radio network controller and coupled to the user equipment device via cellular communication signals;
wherein the NodeB comprises comprising a protocol stack, in turn comprising:
a higher level protocol layer, for configuring a communication channel for communication with the user equipment device according to a trigger field consisting of at least one bit included in a system information block, wherein the trigger field is predetermined to correspond to an attribute of the communication channel so as to either enable or disable the attribute or set a value or a limit for the attribute; and a lowest level protocol layer, for transmitting to the user equipment device the system information block including the trigger field.

* * * * *